Patented Dec. 16, 1924.

1,519,880

UNITED STATES PATENT OFFICE.

HEINRICH SPECKETER AND GUSTAV MÜNCH, OF GRIESHEIM-ON-THE-MAIN, AND FRITZ ROSSTEUTSCHER, OF SCHWANHEIM-ON-THE-MAIN, GERMANY, ASSIGNORS, BY MESNE ASSIGNMENTS, TO AMERICAN LURGI CORPORATION, OF NEW YORK, N. Y., A CORPORATION OF NEW YORK.

PRODUCTION OF PURE ALUMINA.

No Drawing. Application filed October 6, 1922. Serial No. 592,875.

To all whom it may concern:

Be it known that we, HEINRICH SPECKETER, GUSTAV MÜNCH, and FRITZ ROSSTEUTSCHER, residing at Griesheim-on-the-Main, Griesheim-on-the-Main, and Schwanheim-on-the-Main, Germany, respectively, have invented certain new and useful Improvements in the Production of Pure Alumina, of which the following is a specification.

Our invention relates to a process for the production of pure crystallized aluminum chloride and alumina from clay or other aluminiferous materials.

It is well known that by introducing anhydrous hydrochloric acid gases of specially high concentration into solutions obtained in the well known manner of treating raw aluminiferous materials with hydrochloric acid, aluminium chloride can be precipitated and that this precipitated aluminium chloride can be freed from iron by systematic washing.

This method of separation necessitates the use of anhydrous hydrochloric acid gases of high concentration, which are difficult and expensive to produce in practice.

Extensive investigations have shown that the same results may be obtained in a very simple and effective manner and that the aluminum chloride may be separated from the iron with even far less concentrated hydrochloric acid. According to the present invention, the solutions containing aluminium chloride, iron and other foreign chlorides, obtained by treating for example calcined clay with hydrochloric acid, are evaporated in a suitable apparatus, until a syrupy crystal sludge is obtained, which is then cooled, after which the mother liquor is separated from the salt sludge by filtration with suction. In order to obtain the aluminium chloride, containing water of crystallization, in a pure state, it has been found entirely sufficient if the salt mixture obtained in the evaporation in the above-described manner is repeatedly washed with hydrochloric acid. The hydrochloric acid solution required for this purpose amounts to only one quarter or less of the minimum required in the process of salting out the aluminium chloride. Thus, according to the present process, the chloride is obtained in a pure form in a simple manner and with a considerable economy in the use of hydrochloric acid.

The process can be still further improved and a separation of the aluminium chloride from iron effected in a perfect manner with a considerably weaker hydrochloric acid solution, for example, a 20% hydrochloric acid solution easily obtainable from waste gases, by the use for washing of such a hydrochloric acid solution which is almost or completely saturated with aluminium chloride. Such a solution gives a powerful washing effect and the crystalline aluminium chloride is practically insoluble in it.

In carrying out our invention we have obtained good results in proceeding for instance as follows:

Calcined clay is treated with hydrochloric acid. The greater part of the filtered solution is evaporated until a crystal sludge is formed which substantially contains the aluminium chloride in the crystalline state, and the iron chloride in solution. This crystal sludge is filtered with suction, and methodically washed with solutions obtained by treating and enriching the other part of the above-mentioned filtered solution with a mixture of hydrochloric acid and water vapour obtained by the thermic decomposition of the isolated pure aluminium chloride obtained from a previous operation. By this washing procedure the iron chloride is removed from the crystal sludge to a large extent. Finally the crystal sludge is washed with hydrochloric acid free from iron, which acid is preferably obtained from another part of the waste gases of the process of de- composition of aluminium chloride, by condensing or washing with water or diluted hydrochloric acid. The resulting wash liquor is used as acid enriched or saturated with aluminium chloride as long as the iron content permits. The acid wash and mother liquors containing aluminium and iron chlorides are, according to their content, either added to the acid used for treating raw material, or used as washing liquors. When the solutions become rich in iron chloride, they are finally subjected to thermic decomposition, in order to regenerate the hydrochloric acid contained therein. From the pure aluminium chloride obtained, pure alumina is produced.

This process makes it possible to employ a comparatively dilute hydrochloric acid gas containing air and water vapour, such as is obtained from the thermic decomposition carried out, for example in a rotary furnace, whereas the former processes necessitated the employment of concentrated hydrochloric acid gases which could, as a rule, only be obtained from more or less moist gases by drying with sulphuric acid.

Moreover, according to the present process, by enriching with hydrochloric acid the solution used for treating raw aluminiferous material and by re-using the latter for treating further amounts of clay, a more concentrated aluminium chloride solution can be obtained from the beginning, so that a considerable economy in evaporating costs is attained. It is, of course, possible if desired, to dispense with the decomposition of the aluminium chloride produced into alumina, and to use the crystallized aluminium chloride as final product, in which case, a larger amount of hydrochloric acid must be employed.

Example: Of 1000 kgs. of a solution obtained by treating clay or the like with hydrochloric acid and which may contain for instance 350 kgs. $AlCl_3 + 6aq.$, about two thirds are concentrated by evaporation and cooled. The resulting mass of crystals is separated from the mother liquor and washed with hydrocholoric acid or solutions containing same, the washing requiring about 60 kgs. HCl. The mother liquor obtained by filtering with suction is returned into the evaporation pans, while the acid employed for washing is used anew in a systematic way. The salt, which is still moist, is freed from the adhering acid liquid by drying. About 80 per cent, that is about 185 kgs. of chloride are obtained in this manner and are either used as such or are subjected to thermic decomposition, the mixture of hydrochloric acid and steam, which is thus formed, being first caused to pass through a tower sprinkled with the last third of the original solution. (Further towers are employed for absorbing the rest of hydrochloric acid gases which are converted into pure hydrochloric acid.) The solution which ultimately contains a high percentage of free hydrochloric acid is now used for treating further quantities of clay or the like or, in view of its being highly saturated with aluminium chloride, it may be used as a first washing liquor for the crystalline mass obtained by evaporation before being employed for the treatment of fresh raw material. In either case, the enriching with hydrochloric acid results in an increased concentration of the solutions employed for such treatment, thus rendering the evaporation of the chloride solution more economical than if the hydrochloric acid obtained by the thermic decomposition were absorbed in water and employed in the treatment of raw material.

We wish it to be understood that we do not desire to be limited to the exact sequence of steps nor to the exact proportions described, as obvious modifications will readily occur to a person skilled in the art.

We claim:

1. The process which comprises treating aluminiferous material with hydrochloric acid, concentrating by evaporation part of the solution thus obtained, until a sludge of aluminium chloride crystals separates out, introducing the hydrochloric acid gas resulting from the thermic decomposition of aluminium chloride crystals of a prior operation into the non-evaporated part of said solution, washing with this solution said sludge of aluminium chloride crystals and then subjecting said washed sludge of crystals to thermic decomposition.

2. The process which comprises treating aluminiferous material with hydrochloric acid, concentrating by evaporation part of the solution thus obtained, until a sludge of aluminium chloride crystals separates out, introducing the hydrochloric acid gas resulting from the thermic decomposition of aluminium chloride crystals of a prior operation into the non-evaporated part of said solution, washing with this solution said sludge of aluminium chloride crystals, thereafter washing the same with hydrochloric acid free from iron and then subjecting said washed sludge of crystals to thermic decomposition.

3. The process which comprises treating aluminiferous material with hydrochloric acid, concentrating by evaporation part of the solution thus obtained, until a sludge of aluminium chloride crystals separates out, introducing the hydrochloric acid gas resulting from the thermic decomposition of aluminium chloride crystals of a prior operation into the non-evaporated part of said solution, washing with this solution said sludge of aluminium chloride crystals, thereafter washing the same with hydrochloric acid free from iron obtained by condensing part of the acid gases resulting in said thermic decomposition and then subjecting said washed sludge of crystals to thermic decomposition.

4. Process which comprises treating aluminiferous material with a solution containing hydrochloric acid and aluminium chloride whereby a crude solution of aluminium chloride is produced, evaporating a portion of said crude solution until a sludge of aluminium chloride crystals is produced, separating the crystallized aluminium chloride from mother liquor, washing the separated aluminium chloride crystals with a solution produced by introducing hydrochloric acid gas into the remainder of said crude solution and using the resulting wash liquors for treating aluminiferous material in a subsequent operation, further washing the separated aluminium chloride crystals with a solution of hydrochloric acid free of iron produced by dissolving hydrochloric acid gas in water and using the resulting wash liquor in the first washing of separated aluminium chloride crystals in a subsequent operation, and finally calcining the washed aluminium chloride crystals and dissolving a portion of the evolved hydrochloric acid gas in a portion of the crude solution of aluminium chloride of a subsequent operation to produce a solution of hydrochloric acid and aluminium chloride for use for the first washing of separated aluminium chloride crystals in said subsequent operation, and dissolving the remainder of said evolved hydrochloric acid gas in water for the preparation of a solution of hydrochloric acid free of iron for use in the second washing of the aluminium chloride crystals in said subsequent operation.

5. The process which comprises treating aluminiferous material with hydrochloric acid, concentrating by evaporation part of the solution thus obtained until a sludge of aluminium chloride crystals separates out, introducing hydrochloric acid gas resulting from the thermic decomposition of aluminium chloride crystals of a prior operation into the non-evaporated part of said solution, washing with this solution said sludge of aluminium chloride crystals, using the washings for treating aluminiferous material in a subsequent operation, and then subjecting said washed sludge of crystals to thermic decomposition.

6. The process which comprises treating aluminiferous material with hydrochloric acid, concentrating by evaporation part of the solution thus obtained until a sludge of aluminium chloride crystals separates out, introducing hydrochloric acid gas resulting from the thermic decomposition of aluminium chloride crystals of a prior operation into the non-evaporated part of said solution, washing with this solution said sludge of aluminium chloride crystals, using the washings for treating aluminiferous material in a subsequent operation, thereafter washing the said sludge with hydrochloric acid solution free from iron obtained by condensing part of the acid gases resulting from said thermic decomposition, using the resulting washings for washing a sludge of aluminium chloride crystals in a subsequent operation, and then subjecting said washed sludge of crystals to thermic decomposition.

7. The process which comprises evaporating a crude solution of aluminium chloride at atmospheric pressure until a crystal sludge is formed, separating the crystallized aluminium chloride from mother liquor, washing the separated crystals with a solution of hydrochloric acid, and subjecting the washed crystals to thermic decomposition.

8. The process which comprises washing crystals of aluminium chloride with a solution of hydrochloric acid substantially saturated with aluminium chloride prepared by dissolving hydrochloric acid resulting from the thermic decomposition of aluminium chloride crystals of a prior operation in a solution of aluminium chloride, and subjecting the washed crystals to thermic decomposition.

9. The process which comprises evaporating a crude solution of aluminium chloride until a sludge of aluminium chloride crystals is formed, washing said sludge with a solution prepared by dissolving hydrochloric acid resulting from the thermic decomposition of aluminium chloride crystals of a prior operation in a crude solution of aluminium chloride, and subjecting the washed sludge of crystals to thermic decomposition.

10. Process which comprises, evaporating a solution of aluminium chloride at atmospheric pressure, separating crystallized aluminium chloride from mother liquor, and washing the separated aluminium chloride crystals with a solution of hydrochloric acid.

11. Process which comprises, evaporating a solution containing aluminium chloride at atmospheric pressure until a crystal sludge is formed, separating the crystallized aluminium chloride from mother liquor by filtration, and washing the separated aluminium chloride crystals with a soluton of hydrochloric acid.

12. Process which comprises, evaporating a crude solution containing aluminium chloride at atmospheric pressure until a crystal sludge is formed, separating the crystallized aluminium chloride from mother liquor, washing the separated aluminium chloride crystals with a relatively dilute solution of hydrochloric acid substantially saturated with aluminium chloride, and thereafter washing said crystals with a solution of hydrochloric acid free from iron.

13. Process which comprises, evaporating a crude solution containing aluminium chloride until a crystal sludge is formed, separating the crystallized aluminium chloride from mother liquor, and washing the separated aluminium chloride crystals with a solution containing not more than about 20% of hydrochloric acid.

14. Process which comprises, washing aluminium chloride crystals with a solution of hydrochloric acid containing aluminium chloride.

15. Process which comprises, washing aluminium chloride crystals with a solution of hydrochloric acid substantially saturated with aluminium chloride.

16. Process which comprises, washing aluminium chloride crystals with a solution containing aluminium chloride and about 20% of hydrochloric acid.

17. Process which comprises, washing aluminium chloride crystals with a solution containing about 20% of hydrocholoric acid and substantially saturated with aluminium chloride.

18. Process which comprises, washing aluminium chloride crystals with a solution of hydrochloric acid containing aluminium chloride, and thereafter washing the crystals with a solution of hydrochloric acid free from iron.

19. Process which comprises, washing a batch of aluminium chloride crystals with a solution of hydrochloric acid containing aluminium chloride, thereafter washing said batch of crystals with a solution of hydrochloric acid free from iron, and using the resulting washing liquors as the solution of hydrochloric acid free from iron, and using the resulting washing liquors as the solution of hydrochloric acid containing aluminium chloride for the first washing of another batch of aluminium chloride crystals.

20. Process which comprises, washing a batch of aluminium chloride crystals with a solution containing about 20% of hydrochloric acid and substantially saturated with aluminium chloride, thereafter washing said batch of crystals with a relatively concentrated solution of hydrochloric acid free from iron, and using the resulting wash liquors for the first washing of another batch of aluminum chloride crystals.

21. Process which comprises, treating aluminiferous material with a solution of hydrochloric acid, evaporating a portion of the resulting solution containing aluminium chloride until an aluminium chloride crystal sludge is formed, separating the crystallized aluminium chloride from mother liquor, dissolving hydrochloric acid in the remainder of said solution of aluminium chloride, and washing the separated crystallized aluminium chloride with the resulting solution of aluminium chloride and hydrochloric acid.

22. Process which comprises, treating raw aluminiferous material with a solution of hydrochloric acid, separating the resulting solution containing aluminium chloride from undissolved residue, evaporating a portion only of said solution until an aluminium chloride crystal sludge is formed, separating the crystallized aluminium chloride from mother liquor, dissolving hydrochloric acid in the remainder of said solution, washing the separated aluminium chloride crystals with the resulting solution of aluminium chloride and hydrochloric acid, and using the resulting wash liquors for treating raw aluminiferous material.

23. Process which comprises, treating raw aluminiferous material with a solution containing hydrochloric acid, evaporating a portion only of the resulting solution containing aluminium chloride until a sludge of aluminium chloride crystals is formed, dissolving hydrochloric acid in the remainder of said solution, washing said aluminium chloride crystals with the resulting solution, using the resulting wash liquor for treating raw aluminiferous material, further washing said aluminium chloride crystals with a solution of hydrochloric acid free from iron, and using the resulting wash liquor for washing a subsequent batch of aluminium chloride crystals.

In testimony whereof we affix our signatures.

HEINRICH SPECKETER.
GUSTAV MÜNCH.
FRITZ ROSSTEUTSCHER.

Witnesses:
F. H. ANDERSON,
HILDE SCLFICHERT.